United States Patent
Gruchmann et al.

[15] 3,656,597
[45] Apr. 18, 1972

[54] FREE-RUNNING TWO WAY CLUTCH

[72] Inventors: Frank P. Gruchmann, Pittsford; Gordon F. Connelly, Rochester, both of N.Y.

[73] Assignee: Eastman Kodak Company, Rochester, N.Y.

[22] Filed: Aug. 20, 1970

[21] Appl. No.: 65,550

[52] U.S. Cl. ................................. 192/35, 192/38, 192/76
[51] Int. Cl. ............................... F16d 13/16, F16d 13/04
[58] Field of Search ......................... 192/35, 36, 38, 75, 76; 188/74, 134

[56] References Cited

UNITED STATES PATENTS

| | | | |
|---|---|---|---|
| 2,610,718 | 9/1952 | Chapman | 192/76 X |
| 3,055,471 | 9/1962 | Warn et al. | 192/35 UX |
| 3,194,369 | 7/1965 | Witte | 192/36 UX |
| 3,261,437 | 7/1966 | Kramm | 192/35 X |
| 3,300,002 | 1/1967 | Roper | 192/38 X |

*Primary Examiner*—Allan D. Herrmann
*Attorney*—R. W. Hampton and R. Lewis Gable

[57] ABSTRACT

A free-running two way clutch having a drive element and a driven member and comprised of a plurality of rollers rotatable with the driving element and disposed against the inner periphery of a plurality of cam segments distributed about the driving element. The outer surfaces of the cam segments are brought into engagement with the driven member when a rotational motion is imparted to the rollers by the driving element. The symmetrical design of the cam segments permits bi-directional operation. An interface member having high static and low dynamic friction laterally abuts the cam segments. Engagement of the drive element and the driven member is facilitated because of the special frictional properties of the interface member.

2 Claims, 3 Drawing Figures

FRANK P. GRUCHMANN
GORDON F. CONNELLY
INVENTORS

FRANK P. GRUCHMANN
GORDON F. CONNELLY
INVENTORS

FREE-RUNNING TWO WAY CLUTCH

BACKGROUND OF THE INVENTION

1. Field of the Invention

This invention relates generally to mechanical clutches and more specifically to an improved clutch for coupling a rotatable drive shaft with an output or driven member, whereby the driven member may be rotated in either of two directions.

2. Description of the Prior Art

Mechanical clutches for coupling a rotatable drive shaft through intermediate elements to a driven member are well known in the art. However, many of the prior art clutches are limited to operating in a single direction. Those clutches that operate to turn in either direction generally employ complicated engaging mechanisms such as intricate lever linkages, magnetically controlled interlocking members, and various Geneva movements to bi-directionally engage the drive shaft with the driven member. Part of the complexity is due to the desirability of having a reliable and sure engagement, and to obtain this engagement in the minimum length of time once the drive shaft is energized.

The subject invention is distinguishable from the prior art in that the drive transmitting mechanism is a greatly simplified, yet reliable, structure. During interconnecting of the drive shaft with the driven member, the drive transmitting mechanism moves in a substantially radial direction, as opposed to a combination angular and radial movement. This substantially uni-directional movement of the drive transmitting mechanism minimizes the time to engage the driven member. For the subject invention, the engagement time is equal to a small fraction of the time it takes for the drive shaft to rotate one revolution. In addition, the simplified structure of the drive transmitting mechanism permits a substantially greater area of contact between the drive transmitting mechanism and the driven member than that of comparable prior art clutches. This capability greatly decreases the likelihood of relative angular movement (slippage) between the driving element and the driven member once the driven member is engaged.

The subject invention is believed to permit a reduced engagement time, eliminate slippage problems, and overcome other known disadvantages of prior clutch mechanisms.

SUMMARY OF THE INVENTION

One of the objects of the present invention is to replace the complex drive transmitting mechanisms with a simplified novel arrangement for engaging the drive shaft with the driven member.

Another object of the invention is to provide a bi-directional clutch of the type that can be used for driving elements in either direction.

Another object of the invention is to provide a novel mechanism which minimizes input backlash during startup and dynamic power loss during operation.

A still further object of this invention is to provide a clutch of the type which will permit the driven member to rotate freely when the drive shaft is not energized.

A novel free-running two way clutch is disclosed. The clutch is comprised of a rotatable drive shaft, a rotatable driven member, at least one roller operably connected to the drive shaft for rotation about the axis of the drive shaft, at least one cam member interposed between the drive shaft and the driven member, the cam member being biased by circumferential springs so as to be disposed against the outer periphery of the roller, and a restraining member abutting the cam member. The restraining member has a relatively high static friction which serves to retard the angular movement of the cam member during initial rotary motion of the drive shaft. Once the driven member is engaged, the driven member, drive shaft, the roller, and the cam member all rotate at substantially equal angular velocities. During operation, the restraining member continues to abut the rotating cam member. Little drag results from this contact because the restraining member has relatively low dynamic friction.

When the drive shaft is not energized, the circumferential springs bias the cam member free from contact with the driven member. This biasing, when the drive shaft is not energized, permits the free running of the driven member relative to the driven shaft.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Because mechanical clutches are well known, the present description will be directed in particular to elements forming part of, or cooperating more directly with, apparatus in accordance with the present invention. It is to be understood all clutch elements not specifically shown or described may take various forms well known to those skilled in the art.

Figure 1:
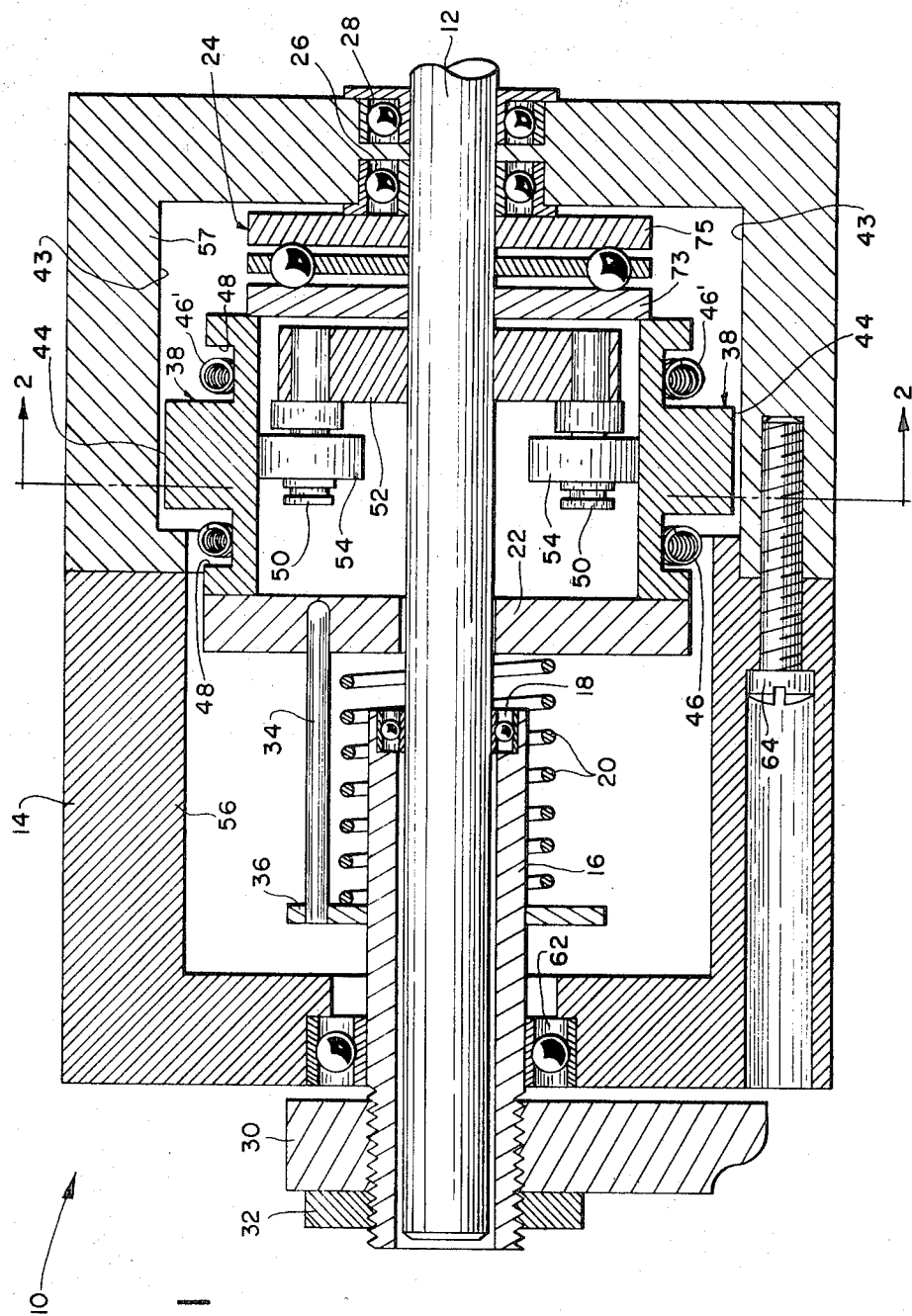
FIG. 1 is a cross-sectional view of the clutch assembly.

Referring to FIG. 1, the clutch assembly shown is identified generally by numeral 10. Clutch assembly 10 includes a driven member 14 mounted for rotation in either direction about a central axis, and a drive shaft 12 extending through driven member 14 and also mounted for rotation in either direction about the same axis as that of driven member 14.

Driven member 14 is in the form of a hollow cylinder comprised of two parts, 56 and 57, and closed at each end except for openings through which the drive shaft 12 passes. At one end of the driven member 14 the drive shaft 12 is mounted in bearings 26 and 28 to permit shaft 12 to rotate freely within the driven member 14.

At the other end of the driven member 14, the drive shaft 12 is disposed for free rotation in a fixed sleeve 16, being supported for such rotation by bearing 18. Bearing 18 preferably is made of an impregnated oil type material to minimize power loss from friction due to contact between shaft 12 and the bearing 18. Sleeve 16 extends outwardly through mounting bracket 30 in which it is threaded and locked in position with a lock nut 32. Bearing 62 on the sleeve 16 permits free rotation of the driven member 14 about the sleeve 16.

Sleeve 16 extends inwardly approximately one-third the length of driven member 14, the inwardly extending portion having a circular flange 36, the outer diameter of which is approximately twice the outer diameter of sleeve 16. A pin 34 is inserted through flange 36 and extends parallel to the axis of driven member 14 into a disc 22, which has a hole through which the drive shaft 12 passes. Pin 34 prevents rotary movement of the disc 22. Disc 22 has surface properties of a special nature, which will be described later. A helical spring 20 is interposed between flange 36 and disc 22. Spring 20 urges disc 22 axially toward cam member 38 to insure maximum surface contact between disc 22 and the cam member 38.

The shape of the cam member 38 in the axial direction is illustrated in FIG. 1.

Figure 2:
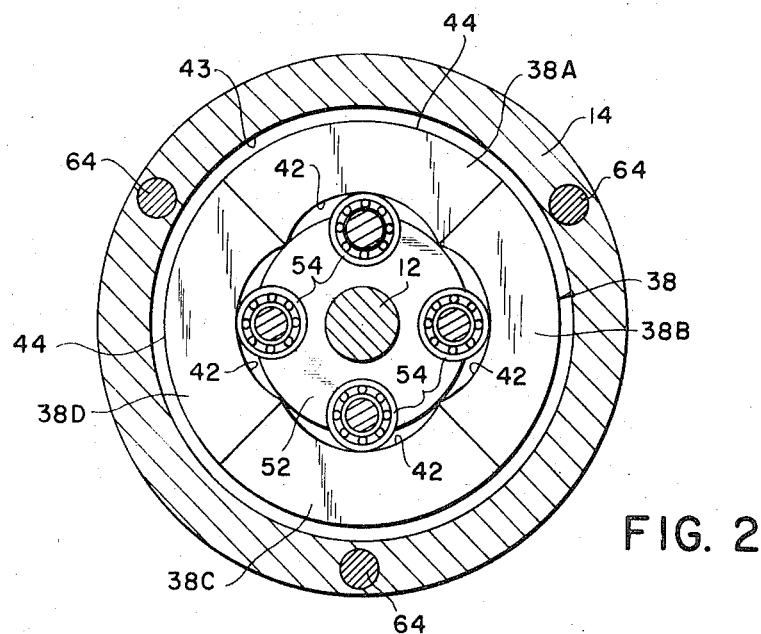
FIG. 2 is a cross-section of the assembled clutch taken on line 1—1 of FIG. 1 and shows the clutch in an idling position.
Figure 3:
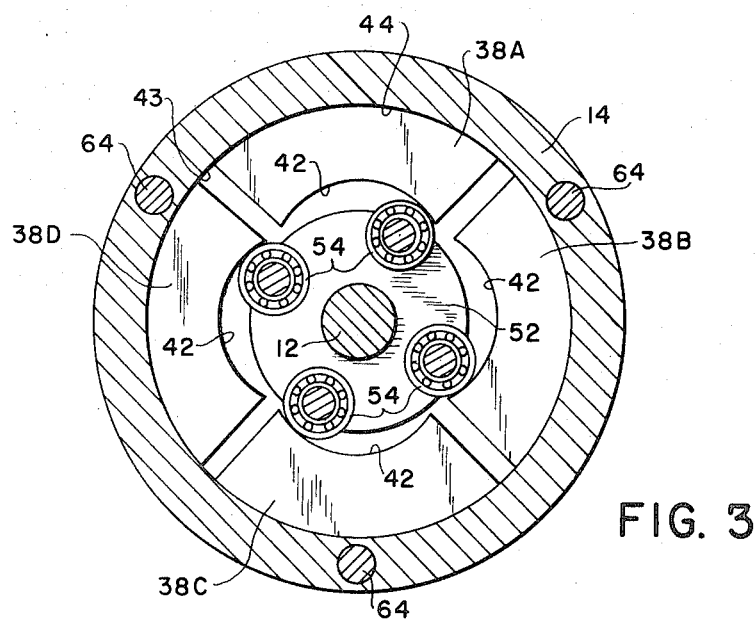
FIG. 3 is a cross-section of the assembled clutch also taken on line 1—1 of FIG. 1 and shows the clutch in an engaged position.

The cam member 38 is in the form of a wide ring formed of four cam segments 38A, 38B, 38C, and 38D, as illustrated in FIGS. 2 and 3. Each segment is capable of radial movement toward and from the inner peripheral surface 43 of the driven member 14. The segments are held in place by bias springs 46 and 46′ which are disposed in annular channels 48, in the outer periphery of the cam member 38. The inner surfaces 42 of the segments are arcuate when viewed in cross-section (FIGS. 2 and 3). It will be noted from these figures, that the arcuate inner surfaces 42 form cam surfaces to be engaged by rollers 54 and that the diametrically opposite cam surfaces are similar. When cam member 38 is not engaged with driven member 14 through the rollers 54, the clutch assembly 10 is in the idling position, as illustrated in FIG. 2.

The clutch mechanism for operably interconnecting drive shaft 12 with driven member 14 includes a plurality of studs 50 which are pressed into flange 52 of the drive shaft 12, parallel to the axis of the shaft 12 and to a depth equal to the axial width of the flange 52. A roller, denoted by 54, is placed over the exposed end of each of the studs 50 and is retained on the stud 50 by suitable flared means. In the preferred embodiment the rollers 54 are bearing filled to reduced frictional effects with the rigidly secured studs 50.

The inner surface 42 of each cam segment is disposed against the outer surface of a roller 54 whereby the cam segments surround a plurality of roller 54. The cross-sectional views of FIGS. 2 and 3 illustrate the outer and the inner surfaces of the segments comprising cam member 38. Each inner surface 42 of a segment forms an arc of a circle, the circle having a center point lying between the axis of the shaft 12 and the surface 42 on an imaginary line which extends from the center of the shaft 12 and bisects the segment. In the idling position the combined inner surface formed by the plurality of cam segments of member 38 takes the shape of a closed path, the closed path composed of a plurality of circular arcs, each arc being symmetrical about an imaginary line radially extending from the axis of the drive shaft 12 and bisecting the corresponding cam segment. As will be described hereinafter this symmetry of each inner surface 42 permits bi-directional operation of clutch assembly 10.

A thrust bearing 24 is interposed between the flange 52 and the bearing 26. It consists of a bearing filled disc centered between two flat plates, 73 and 75. Both plates are free to rotate about the drive shaft 12 independently of each other. Plate 73 limits axial movement of the cam member 38 due to the axial force applied by the spring 20 through the disc 22 on the cam segments comprising member 38. Since plate 73 is free to rotate, any rotational motion applied to the cam segments will not be impeded by engagement of the segments 38 with plate 73. Likewise, any rotational motion imparted to driven member 14 will not be impeded by plate 75 if member 14 should come into contact with plate 75.

For ease of overall assembly, the driven member 14 consists of two segments, 56 and 57. These two segments are rigidly secured to each other by a plurality of screws 64.

In operation, rotary motion is imparted to the drive shaft 12 by an externally applied power source such as an electric motor. Rotation of the drive shaft 12 causes the rollers 54 carried by the studs 50 to rotate along cam surfaces 42 of the cam segments comprising member 38 in the direction of rotation of the drive shaft 12. Since the surfaces 42 are symmetrical about the midpoint of each of the segments, the shaft 12 may be rotated in either direction. This capability permits bi-directional operation of clutch assembly 10.

As alluded to earlier, disc 22 has special surface properties. These special properties are high static friction and low dynamic friction. The high static friction of the disc 22 restrains angular movement of the cam segments of member 38 during the initial angular movement of rollers 54 on surfaces 42 of the cam segments of member 38. This restraining of angular movement of member 38 by the disc 22 is necessary to permit the rollers 54 to rotate relative to member 38 toward the extremity of surfaces 42. As rollers 54 move toward the extreme region of each of surfaces 42, the cam segments are driven radially outward such that outer surfaces 44 of the segments engage the inner surface 43 of driven member 14. If disc 22 were not present to initially restrain the cam segments comprising member 38, the frictional forces between rollers 54 and surfaces 42 along with the initial rotary movement of rollers 54 would impart a like rotary motion to member 38 thereby possibly preventing rollers 54 from reaching the extremities of surfaces 42. Failure to reach the end region of surfaces 42 would prevent the generation of the radially outwardly forces necessary to force the segments radially outwardly. If the outward force is not developed, cam member 38 would never engage driven member 14. Also, it is most desirable to restrain member 38 such that driven member 14 may be engaged as soon as possible. By engaging member 14 as quickly as possible, input backlash is eliminated.

Once the cam segments of member 38 engage driven member 14, member 14 rotates at the identical speed of drive shaft 12. The low dynamic friction of the disc 22 enables the cam member 38 to rotate while disposed against disc 22 with a minimum of power loss. The other side of the cam segments of member 38 remain disposed against the plate 73 of thrust bearing 24. Plate 73 need not be made of low-friction material as it is free to rotate about shaft 12 along with member 38.

Once the applied power is removed from drive shaft 12 the shaft 12 will stop rotating and the cam segments of member 38 will automatically disengage from driven member 14. Since driven member 14 is then free of externally applied forces member 14 may continue rotating thus acting as a free-running idler. What happens is that when drive shaft 12 stops, the dominant applied force on the cam segments of member 38 is the radially inwardly force applied by bias springs 46 and 46'. This force moves all cam segments of member 38 toward drive shaft 12. As the segments move inwardly, rollers 54 rotate back along cam surfaces 42 to the midpoint of each cam surface. When this point is reached, the segments are removed from driven member 14 by springs 46, as far as possible.

This clutch is adaptable to many uses. One use is to drive both reels of a film viewer. In this system it is necessary to drive the film take-up reel and the film supply reel in one direction during viewing. After viewing, the film is returned to the supply reel from the take-up reel, which requires driving both reels in a direction opposite to that of when the film was being viewed. This clutch will permit one reel to be driven while the other reel is free of its drive to rotate or both reels can be driven simultaneously. This device permits a definite safety factor over hand-operated viewers as the reel crank can be eliminated. Reel cranks can be dangerous when used for rotating heavy high-inertia loads. The operator's hand may slip from the crank which can then cause injury to the operator's wrist or hand as the crank rotates at a high angular velocity.

This clutch can also be adapted for use as a redundant drive. As so used, one clutch would be driven by an externally applied power source. A second clutch, not driven, would be geared to the driven clutch. This second clutch would be in the idling position. If the power source for the first clutch failed, a power source for the second clutch would be activated to drive this clutch. In this configuration, the first clutch would then be in the idling position. This system is further simplified because of the bi-directional character of the clutches.

The invention has been described in detail with particular reference to a preferred embodiment thereof, but it will be understood that variations and modifications can be effected within the spirit and scope of the invention.

We claim:

1. A two way clutch which comprises:
   a. a drive shaft mounted for rotation in either direction and having an axis;
   b. a driven member mounted for rotation in either direction;
   c. at least one cam member operative for rotatively coupling said rotatable drive shaft to said rotatable driven member, said one cam member having an inner and an outer peripheral surface each configured in the shape of an arc of a circle defined by a point said inner peripheral surface being disposed so that its point is disposed a greater distance from said inner peripheral surface then said drive shaft axis, said outer peripheral surface being disposed so that its center is disposed coincident with said drive shaft axis;
   d. at least one roller operably connected to said drive shaft, said roller being rotatable about said drive shaft axis and having a surface disposable against said inner periphery of said cam member;
   e. a disc having a surface abutting said cam member, said surface of said disc having a relatively high static friction for restraining angular movement of said cam member as said roller rotates during initial relatively low velocity rotation of said drive shaft to effect the relative movement of said roller along said inner peripheral surface and to thereby effect a radial outward movement of said cam member from said drive shaft axis so that said outer periphery of said cam member engages said driven member, said surface at said disc having a relatively low dynamic friction for providing a relatively small amount of retardation at relatively high velocity rotation of said cam member;

f. means for mounting said disc in a fixed position relative to said drive shaft; and g. spring means disposed to bias said surface of said disc against said cam member 2. A two way clutch as defined in claim 1 wherein a plurality of rollers are rotatably connected to said drive shaft, each roller being disposed on said inner periphery of said cam member, the rotation of said rollers effecting the engagement of each of said cam members with said driven member.

* * * * *